No. 702,363. Patented June 10, 1902.
J. F. FIERKE.
NUT LOCK AND KEY.
(Application filed Apr. 5, 1901.)
(No Model.) 2 Sheets—Sheet 2.
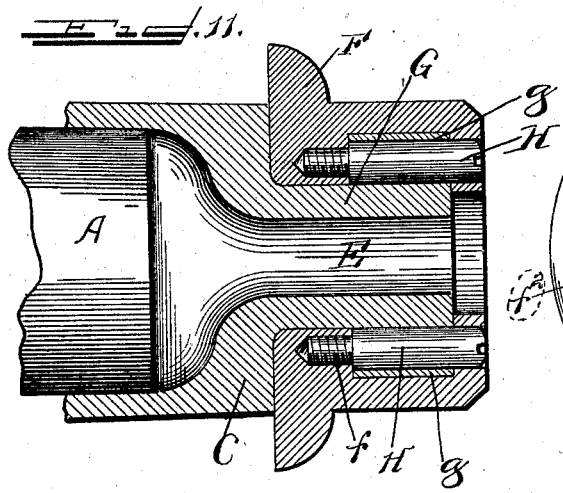
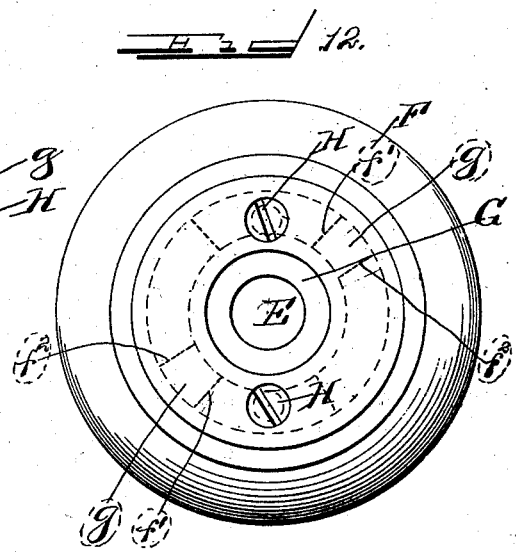
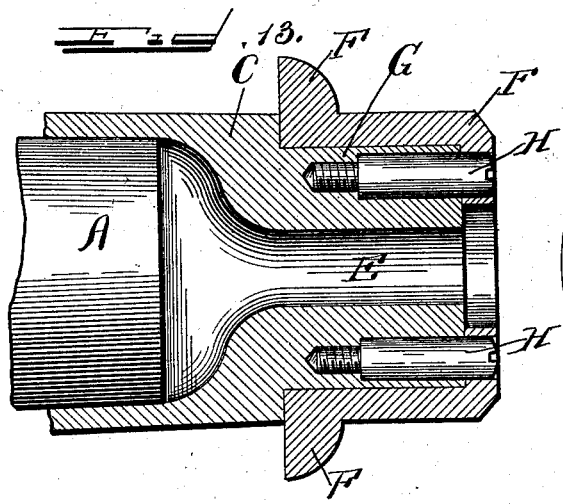
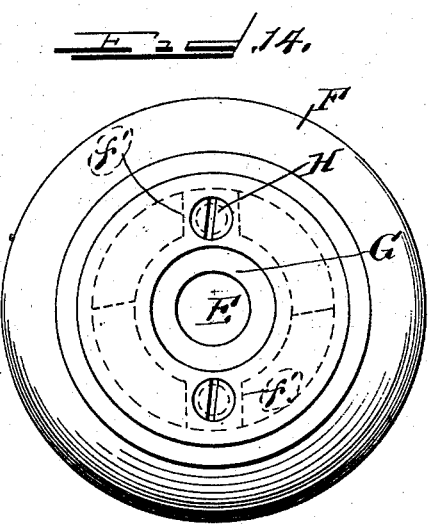
WITNESSES
Ira D. Perry
J B Weir
INVENTOR
John F. Fierke
By Raymond & Barnett
Attys
THE NORRIS PETERS CO., PHOTO-LITHO., WASHINGTON, D. C.

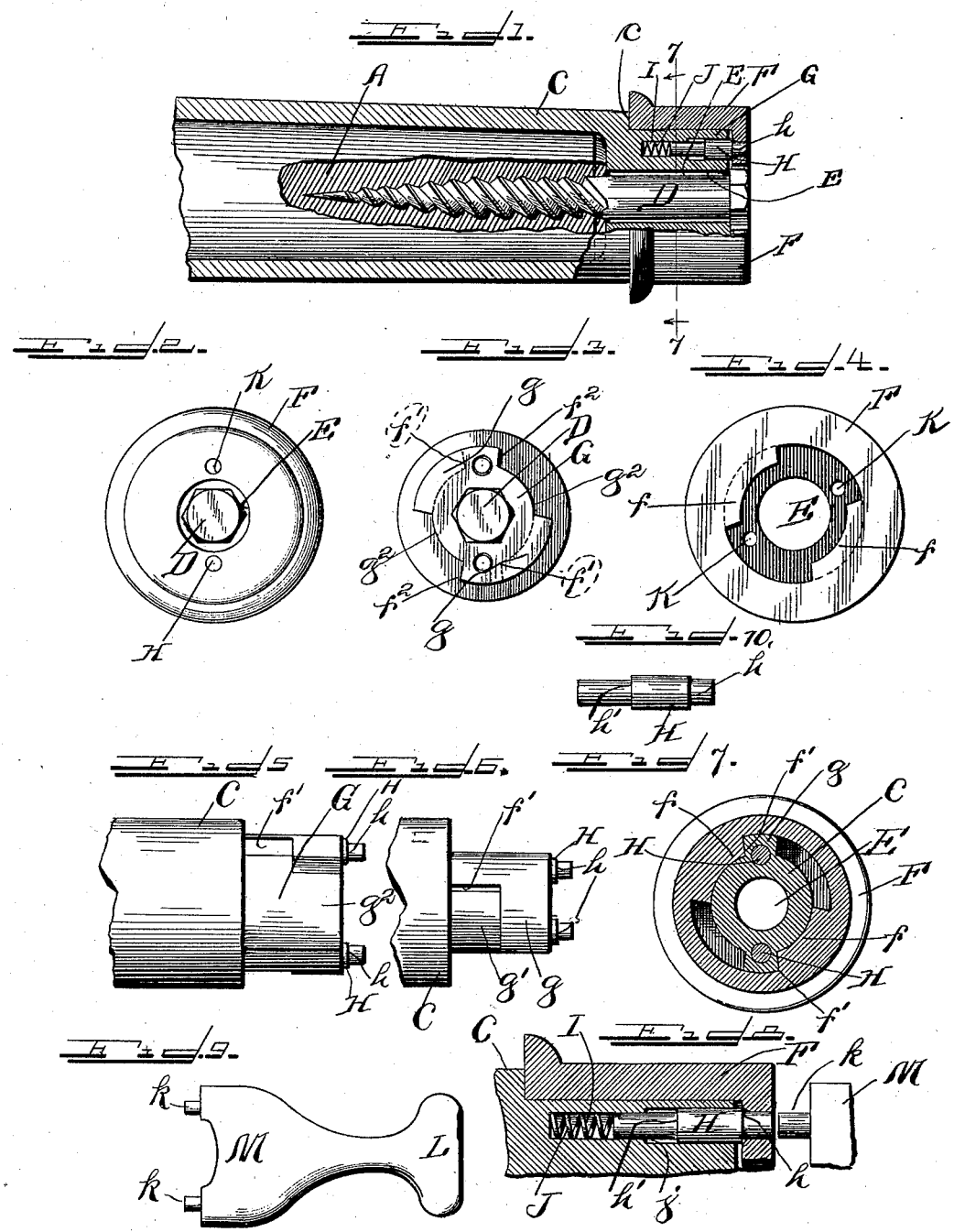

UNITED STATES PATENT OFFICE.

JOHN F. FIERKE, OF DUNDEE, ILLINOIS.

NUT-LOCK AND KEY.

SPECIFICATION forming part of Letters Patent No. 702,363, dated June 10, 1902.

Application filed April 5, 1901. Serial No. 54,425. (No model.)

*To all whom it may concern:*

Be it known that I, JOHN F. FIERKE, a citizen of the United States, residing at Dundee, in the county of Kane and State of Illinois, have invented certain new and useful Improvements in Nut-Locks and Keys, of which the following is a specification.

My invention relates to improvements in locking-nuts, and has particular reference to such nuts when used upon the ends of metallic vehicle-axles or upon metallic skeins which are mounted upon wooden axles.

The object of my invention is to provide such a nut which is simple and strong in construction, which will be certainly, positively, and automatically locked whenever applied, the attachment and locking of the nut being done at one operation, and which may be, in effect, unlocked and detached at one operation.

Another object of my invention is to provide such a device in which the locking parts shall be covered and protected, so that they may not be clogged by dirt or displaced or damaged when the parts are all assembled.

A further object is to provide such a device which may be made with a minimum amount of machine-work, thereby reducing the cost of production.

A further object of my invention is to provide such a device in which all the parts may be made readily interchangeable.

These and such other objects as may hereinafter appear are attained by the devices illustrated in the accompanying drawings, in which—

Figure 1 is a view, partially in section, of the end of a wooden axle provided with a metallic skein and an attaching-nut, said skein and nut embodying the preferred form of my invention. Fig. 2 is an end view of the nut and skein or axle when assembled. Fig. 3 is an end view of the skein with the nut removed. Fig. 4 is a plan view of the nut, viewed from the inside or skein end thereof. Figs. 5 and 6 are elevations of the skein viewed from different points. Fig. 7 is a cross-sectional view on the line 7 7 of Fig. 1 looking in the direction indicated by the arrows. Fig. 8 is an enlarged detail showing a portion of the skein and nut in section with the locking-pin and spring in elevation, said pin being shown as engaging the nut and a portion of the unlocking-key being also shown. Fig. 9 shows a key or spanner especially adapted for use in unlocking my improved device. Fig. 10 shows my improved locking-pin. Figs. 11 and 13 show horizontal sectional views of modified forms of my nut-locking device, and Figs. 12 and 14 show end views of these same modified forms.

Like letters of reference indicate corresponding parts in the several figures of the drawings.

Referring by letter to the accompanying drawings, A indicates a wooden axle upon which is fitted a skein C, which skein is secured to the axle by a lag-screw D, which passes through a central opening E in the skein and nut and is driven into the end of the wooden axle.

F is a nut adapted to engage and be locked with the end of the skein for the purpose of holding the hub of a wheel upon the axle. The end of the skein is provided with a reduced portion G, upon which are formed or cast lugs $g$ and undercut channels $g'$. A space $g^2$ is left between said lugs for receiving lugs formed upon the under side of the nut F.

The nut F is provided on its under side with lugs $f$, the space between the inner side of said lugs and the under side of the cap of said nut being cut away to receive the lugs $g$ of the skein when the skein and nut are assembled. It will thus be seen that the skein and nut are adapted to engage each other with what amounts to a bayonet-joint. When the nut and skein are assembled, one end of each of the lugs $f$ on the nut abuts against a corresponding shoulder $f'$ upon the skein.

My locking device, whereby the nut is automatically locked in position after it has been turned to place on the skein, consists of a locking pin or pins H. (In practice I prefer to use two pins on opposite sides of the skein.) In the preferred form of my device these locking-pins are formed with a reduced portion at each end thereof, thereby providing the shoulders $h$ and $h'$. The pin H is mounted upon a coiled spring I, seated within the lower end of a recess J, formed in the end of the skein and at one side of the center thereof. This recess has a reduced portion for receiving the spring I and the reduced lower end of the pin H and an enlarged portion for receiving the thicker part of the pin H. This enlargement of the recess J is constructed in such a manner as to provide an annular shoulder j, against which the shoulder h' of the pin H abuts when the pin is forced in against the tension of the spring I. The reduced portion of the outer end of the pin H is substantially equal in length to the thickness of the end or cap of the nut F. The end of the nut F is provided with perforations corresponding in number to the number of pins H and so located as to register with the recesses J when the nut F is turned to place upon the skein.

The operation of this device is as follows: The pins H—say two, as shown in the drawings—having been mounted in the recesses J upon the springs I, the nut F is placed over the reduced end of the skein C in such a manner that the lugs f of the nut F will pass between the opposing ends of the lugs g of the skein. In this operation the ends of the pins H will abut against the imperforate part of the cap of the nut F. Consequently the pins H will be forced by the nut F inwardly against the tension of the springs I. The nut F having been fitted over the reduced end of the skein C until the inner edge of the nut abuts against the shoulder c on the skein, the nut is partially rotated upon the skein, thereby causing the lugs f on the nut to slide under the overhanging portion of the lugs g on the skein until one end of each of the lugs f is carried around to an abutment with the shoulder f' on the lug g. At this point the perforations K in the end of the nut F will register with the recesses J in the skein. These perforations are slightly larger in diameter than the reduced outer end of the pins H, but are smaller in diameter than the diameter of the pins H at the shoulder h. Consequently at this point the springs I will force the pins H into the perforations K until the shoulders h on the pins H abut against the under side of the cap of the nut F, and the nut is thereby securely locked in position. It will be observed that this locking operation is wholly automatic, that with the parts so locked together the locking device is wholly protected against loss or injury and is substantially protected against admission of dirt and the like, as the ends of the pins H substantially fill the perforations K, and after each removal and replacing of the nut the perforations are automatically cleaned for their entire length by the outward movement of the pin, and the end or head of the lag-screw D substantially fills the large central perforation in the cap of the nut F. Indeed, while the construction shown is preferable because of the saving in expense it is entirely practical to countersink the head of the lag-screw D in the end of the skein, in which event there need be no opening through the nut F except the perforations K, which are filled, as above noted. The nut may also be made without any central perforation if it is made with a slight hollow swell at its center of sufficient size to fit over the projecting end of the lag-screw. It will be further noted that with the parts so assembled there is absolutely no strain upon the locking members. As is well known, there is considerable friction between the end of the hub of the wagon and the opposing end or flange of the attaching-nut secured upon the end of the wagon-axle. So true is this that if a threaded nut with a right-handed thread is used upon the left end of a wagon-axle the friction between the hub and nut will result in unscrewing the nut from the axle unless some suitable locking device is used. With my device, constructed, as shown, so that the lugs f on the nut shall abut against the shoulders f' on the skein, all possible strain is taken off of the locking device, because the rotating force exerted by the friction between the hub of the wheel and the flange of the nut is transmitted through the lugs f against the shoulder f'. Furthermore, where screw-threaded nuts are used it is a recognized fact in practical vehicle-building that these nuts are made by the thousands and are necessarily screw-threaded by a tap, which is usually of some standard gage. In the course of screw-threading such nuts by the thousand it has been found that there is a very perceptible wear on the tap, resulting in a corresponding change in the diameter of the screw-threaded portion of the nuts, so that the nuts first threaded by such tap are appreciably larger in diameter than those last threaded. If now any particular vehicle is fitted with nuts threaded by a new tap and such nuts are lost or damaged, the owner will send to the factory for other nuts and will be very likely to receive nuts which while presumably threaded with the same standard tap were threaded after the tap had been considerably worn, with the result that such nuts will be found too small to fit the axle. On the other hand, if the axle is fitted in the first place with nuts made with a worn tap and it is sought to replace these nuts the owner of the vehicle is very likely to receive nuts made with a new tap, which in consequence will be too large for the axle of his vehicle. It therefore appears that with my device, in which all the parts can be cast and in which no machine-work is required, except the drilling of recesses J and the perforations K, nuts may be made of a standard size, so as to be absolutely uniform and interchangeable. This will be recognized by vehicle-makers as a great practical advantage, as well as a great saving in expense, on account of the small amount of machine-work required.

To unlock and remove my nut, I have found the key or nut-spanner shown in Fig. 9 to be most convenient. This spanner consists of a handle part L and a body part M. Projecting from the end of the body part M are pins k. These pins are of a length substantially the same as the thickness of the cap portion of the nut F and are of a diameter somewhat smaller than the diameter of the perforations K.

To remove the nut, I insert the pins $k$ into the perforations K, thereby forcing the ends of the pins H out of engagement with the nut. Thereupon by turning the handle L the nut is caused to rotate upon the skein until the lugs $f$ on the nut are turned out of engagement with the lugs $g$. In the construction shown in the drawings this will bring them to a point where the lugs $f$ will abut against the shoulders $f^2$ on the skein. As soon as the lugs $f$ are disengaged from the lugs $g$ the tension of the springs I, operating against the pins H, will force the cap F partially off of the skein, and then the cap may be readily removed. It will be observed that with the construction shown the length of the pins $k$ is just sufficient to force the pins H out of engagement with the nut. If, however, a key or spanner with longer pins be used, they might not only pass through the perforations K in the nut, but also into the recesses J in the skein but for the fact that the shoulder $h'$ on the pin H, abutting against the shoulder $j$ in the recess J, acts as a stop as soon as the pins H have been forced inwardly sufficiently far to be disengaged from the nut.

It is apparent, however, that my device may be unlocked with a pencil, nail, or any other similar article which may be convenient at the time.

In Figs. 11 and 12 I have shown a modified form of my nut-locking device, which involves the same principles of construction as the form previously described, except that it is not automatic. In this modification instead of using spring-actuated locking-pins I provide perforations through the lugs $g$ and screw-threaded recesses in the lugs $f$, which perforations and recesses register with the perforations K in the cap of the nut. When the nut is applied to the end of the skein or axle and is turned to place, the pins H, which in this modified form are screw-threaded at their inner ends, are inserted through the perforations K in the nut, the corresponding perforations through the lugs $g$, and screwed into the recesses in the lugs $f$ on the nut.

In Figs. 13 and 14 I have shown another modified form, in which the pins H are screwed directly into the end of the axle, their projecting ends engaging the perforations in the end of the nut, as before.

Of course various modifications can be made in the details of the parts as shown without departing from the spirit of my invention, and obviously changes—such as in the number of lugs, the number of pins, the exact contour thereof, the shape of the cap, &c.—can be made; but all such changes come within my invention and are contemplated thereby.

While I have in the specification and claims sometimes described my device as applied to a vehicle-axle and sometimes to a skein, it will of course be understood that it is immaterial whether a skein or a metallic axle be used, and in the claims I have employed the term "axle" to designate either a metallic axle or an axle-skein.

Having thus described my invention, what I claim, and desire to secure by Letters Patent, is—

1. The combination with an axle having a reduced end portion, of a recessed nut adapted to such reduced portion and having a perforation for the reception of a locking-pin, and a spring-pressed locking-pin carried by the reduced portion of the axle and adapted to extend entirely through the perforation to prevent access of foreign matter therein, said pin having fixed limits of inward and outward movement.

2. The combination with an axle having a reduced end portion, of a nut adapted to said reduced end portion, and having a perforation for the reception of a locking-pin, and a spring-pressed locking-pin carried by the axle and adapted to said perforation, said pin having a shoulder for engagement with the inner wall of the nut, and a second shoulder adapted to prevent excessive inward movement of said pin.

3. The combination with an axle having a reduced end portion, of a recessed nut adapted to such reduced portion and having a perforation for the reception of a locking-pin, interfitting and abutting lugs provided on both the reduced end portion of the axle and the nut to prevent excessive movement of the latter, and a locking-pin carried by the axle and adapted to extend within said perforation.

4. The combination with an axle having a reduced end portion, a recessed nut adapted thereto and having a perforation for the reception of a locking-pin, interfitting and abutting lugs provided on the axle and nut, a locking-pin having an enlarged central portion forming end shoulders for preventing excessive endwise movements of the pin, said pin being adapted to a suitable opening in the end of the axle, and a spring seated within said opening and normally projecting the pin, substantially as specified.

JOHN F. FIERKE.

Witnesses:
O. R. BARNETT,
M. E. SHIELDS.